United States Patent [19]

Campbell

[11] Patent Number: 4,518,089
[45] Date of Patent: May 21, 1985

[54] AUXILIARY CLOSET SYSTEM

[76] Inventor: Frank P. Campbell, 13463 W. 78th Pl., Arvada, Colo. 80005

[21] Appl. No.: 521,102

[22] Filed: Aug. 8, 1983

Related U.S. Application Data

[63] Continuation-in-part of Ser. No. 318,046, Nov. 4, 1981, abandoned.

[51] Int. Cl.$^3$ ............................................. A47F 5/00
[52] U.S. Cl. .................................. 211/118; 211/123; 403/197; 403/199
[58] Field of Search ............... 211/113, 117, 118, 123, 211/182, 105.1; 403/230, 240, 243, 261, 197, 199, 201

[56] References Cited

U.S. PATENT DOCUMENTS

| 1,810,028 | 6/1931 | Paszkowski | 403/261 X |
|---|---|---|---|
| 2,939,588 | 6/1960 | Nalle | 211/113 |
| 3,187,904 | 6/1965 | Kiechle | 211/118 |
| 3,802,573 | 4/1974 | Davis et al. | 211/118 |
| 4,023,762 | 5/1977 | Batts et al. | 211/113 X |
| 4,131,379 | 12/1978 | Gordy et al. | 403/238 X |

FOREIGN PATENT DOCUMENTS

| 128195 | 10/1928 | Switzerland | 123/ |
| 1303626 | 1/1973 | United Kingdom | 211/105.1 |

Primary Examiner—Robert W. Gibson, Jr.
Attorney, Agent, or Firm—Bruce G. Klaas

[57] ABSTRACT

An auxiliary closet assembly having at least one pair of hanger bar members suspended from a main closet hanger rod and supporting at least one auxiliary hanger rod therebetween in downwardly spaced vertical relationship to the main closet hanger rod.

13 Claims, 14 Drawing Figures

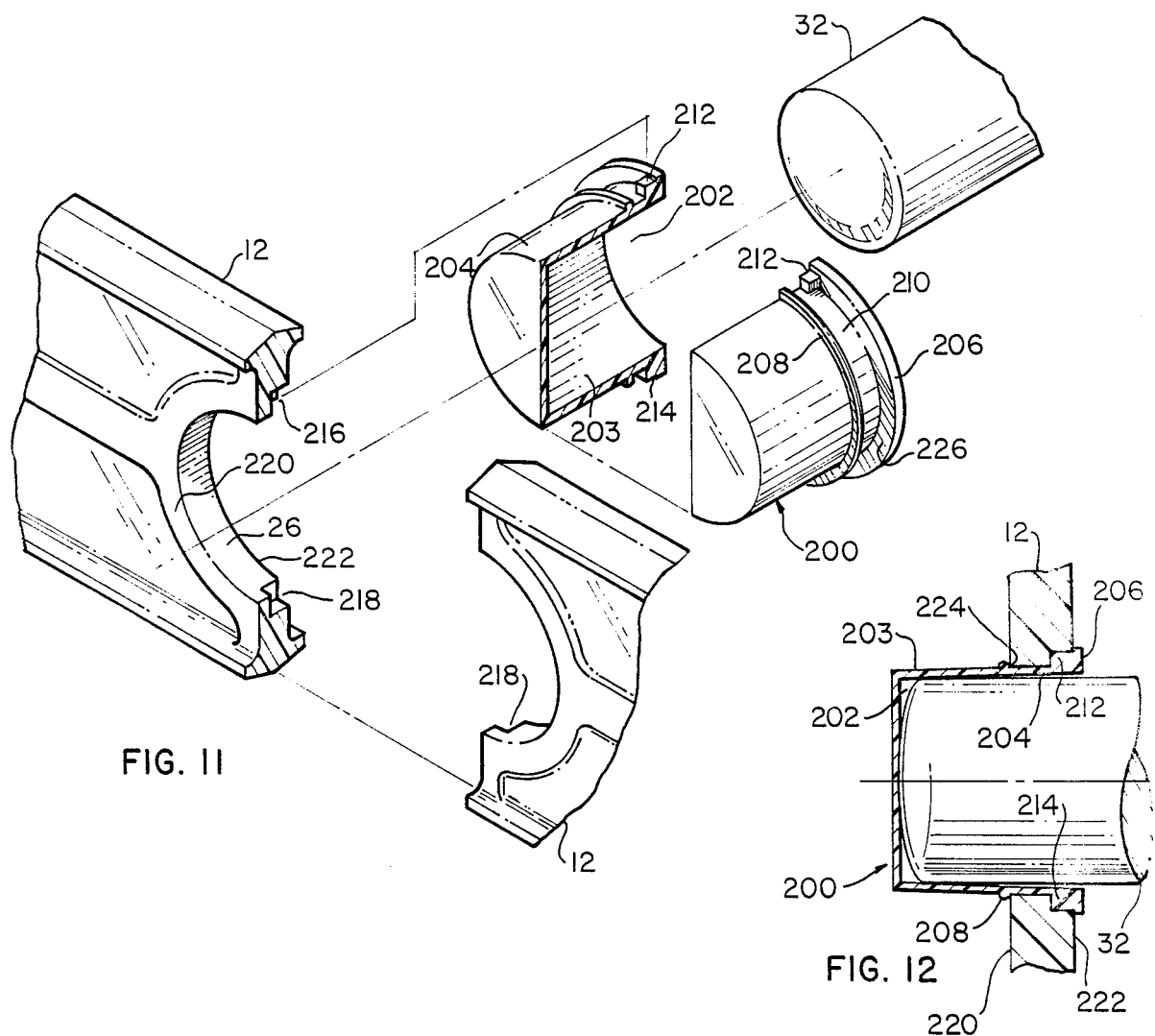
FIG. 11
FIG. 12
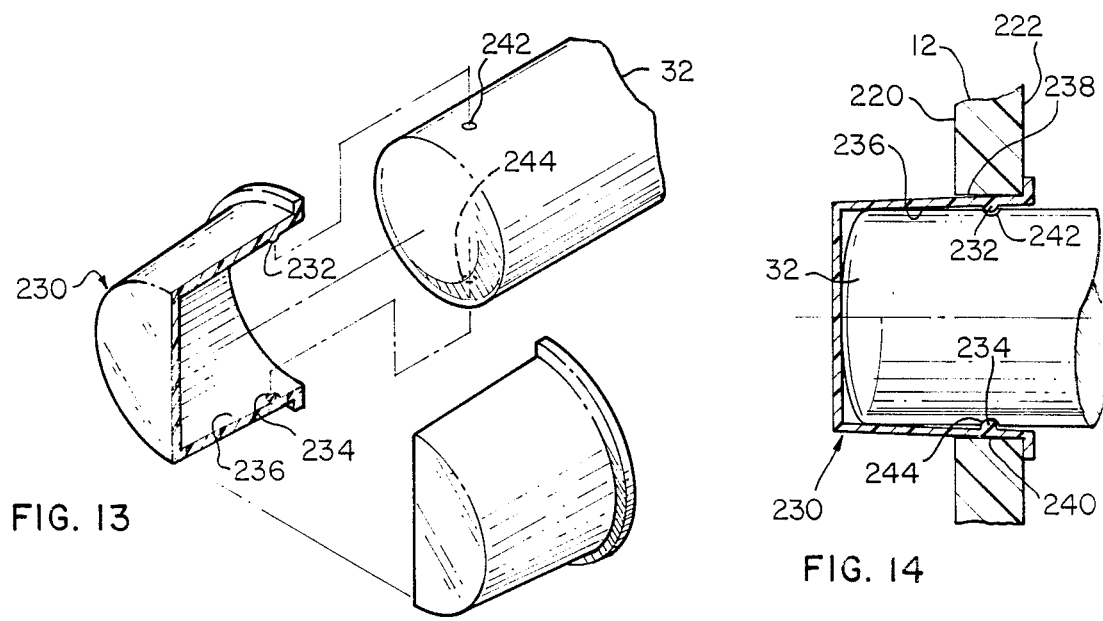
FIG. 13
FIG. 14

AUXILIARY CLOSET SYSTEM

This application is a continuation-in-part of my co-ending prior U.S. patent application Ser. No. 318,046 filed Nov. 4, 1981, now abandoned, for Auxiliary Closet System.

BACKGROUND & SUMMARY OF INVENTION

This invention relates to apparatus for hanging clothes in a closet and, more particularly, to an auxiliary clothes hanging system adapted to be supported on a conventional main clothes closet hanger bar fixedly mounted in a conventional manner in a conventional closet space.

At the present time, the majority of clothes closets in homes, offices and other buildings comprise one or more main hanger rod members of circular cross-section which are fixedly mounted on the side walls or under a platform and extend across one side of the closet in upwardly spaced relationship to the closet floor. The distance of the hanger rod above the floor of the closet generally varies between five to six feet to accommodate varying length garments such as outer coats, dresses, shirts, pants, etc. Thus, the location of the hanger rod is such as to accommodate the longest length garment and shorter length garments are located well above the floor whereby a substantial amount of closet space may be unused. Furthermore, children and handicapped persons confined to wheel chairs are unable to reach the main hanger rod.

The purpose of this invention is to provide an auxiliary hanger bar system which may be mounted on the conventional main hanger bar to better utilize the closet space and enable children and handicapped persons to reach an auxiliary hanger rod suspended on the main hanger rod by auxiliary hanger bar members. While the general concept has been known heretofore, at the present time there appears to be no commercially available auxiliary hanger bar systems nor is there any evidence that any such prior art systems may have been successfully commercially exploited.

Among the important features of the present invention are the following: (1) rigidity and strength of the component parts; (2) ease of manufacture and assembly of the component parts; (3) adaptability and variability in use of the component parts; (4) low cost of manufacture and packaging of the component parts; (5) retention of the parts after assembly in assembled position; (6) safety of the apparatus in use; (7) packaging of parts in relatively small size compact containers; and (8) assembly of parts and mounting of assembly without change of existing closet structure and without requiring assembly tools.

In general, the invention comprises at least one pair of identically shaped elongated one piece molded plastic hanger bar members. Each hanger bar member has a mounting opening at one end for pivotal association with a main closet hanger rod to enable the hanger bar to hang vertically downwardly from the main closet hanger rod and at least one auxiliary rod opening in the main body portion for supporting one end portion of a rigid auxiliary hanger rod in vertically downwardly spaced relationship to the main closet hanger rod. Separate one piece fastener devices are mounted on the end portions of the auxiliary hanger rod to releasably connect the auxiliary hanger rod to each of the hanger bar members.

BRIEF DESCRIPTION OF DRAWING

Alternative and preferred embodiments of the invention are shown in the accompanying drawing in which:

FIG. 11 is an exploded perspective view of an alternative embodiment of the rod retainer means;

FIG. 12 is a cross-sectional view of the rod retainer means of FIG. 11 in assembled position;

FIG. 13 is an exploded perspective view of another alternative embodiment of the rod retainer means; and FIG. 14. is a cross-sectional view of the rod retainer means of FIG. 13 in assembled position.

DETAILED DESCRIPTION

Figure 1:
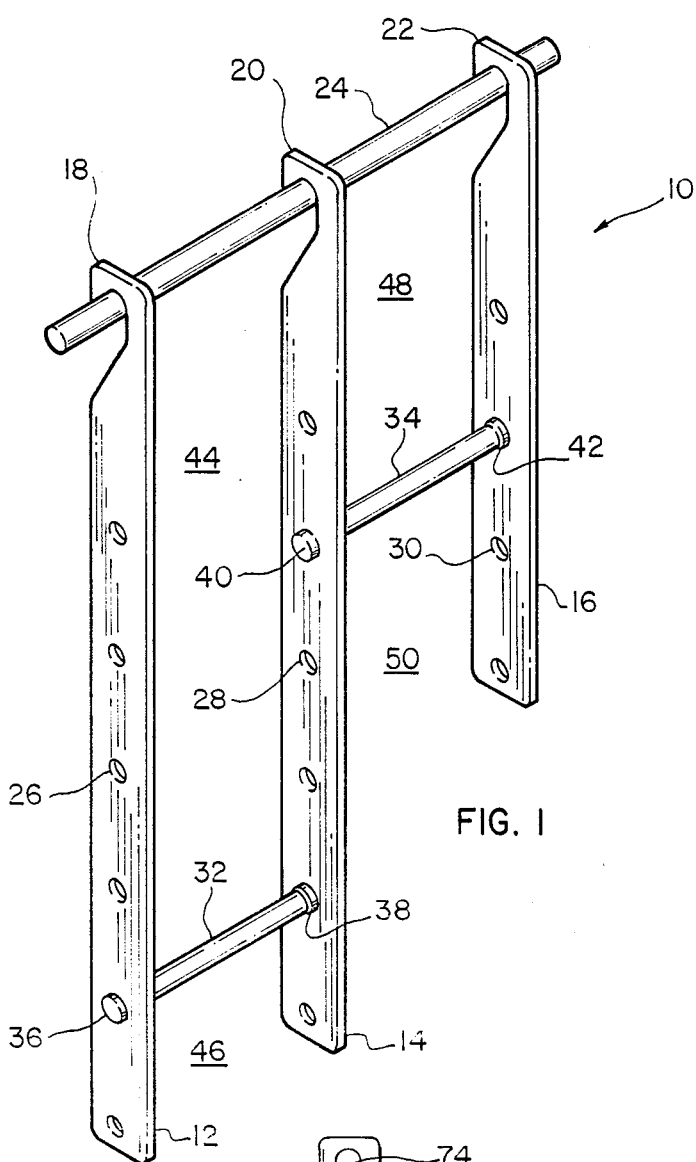
FIG. 1 is a perspective view of one form of an adjustable auxiliary closet rod assembly.

In general, the clothes hanging apparatus 10 of the present invention comprises a plurality of rigid hanger bar members 12, 14, 16 which have main rod attachment means 18, 20, 22 at the upper end portions for attachment to a conventional horizontally extending main closet rod member 24 which is fixedly or removably rigidly supported between spaced side walls (not shown) of a closet. A plurality of equally vertically spaced circular openings 26, 28, 30 are provided in each hanger bar so as to removably receive auxiliary rod members 32, 34 in aligned pairs of openings of adjacent hanger bar members. Fastening means 36, 38, 40, 42 are mounted on the end portions of rod members 32, 34 for releasably connecting the rod members to the hanger bar members. In this manner, a plurality of garment receiving spaces 44, 46, 48, 50 are provided between the hanger bar members so that garments on conventional clothes hangers can be hung on the main closet rod 24 and on auxiliary support rod members 32, 34 therebelow.

Figure 2:
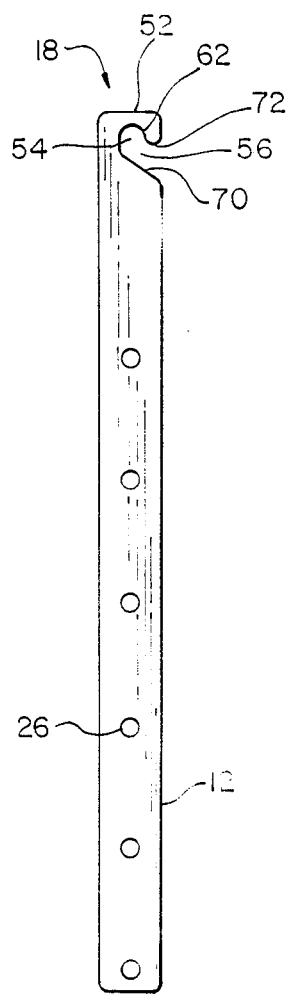
FIG. 2 is a side elevational view of one form of hanger bar for the adjustable auxiliary closet rod assembly of FIG. 1.
Figure 3:
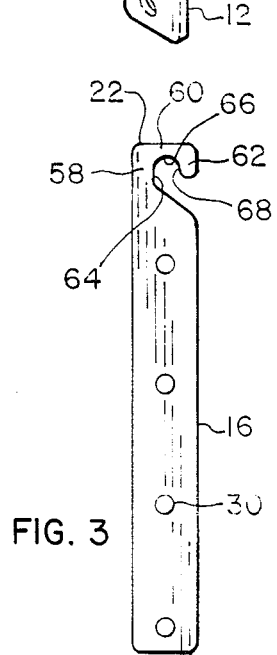
FIG. 3 is a plan view of another form of hanger bar for the adjustable auxiliary closet rod assembly of FIG. 1.
Figure 4:
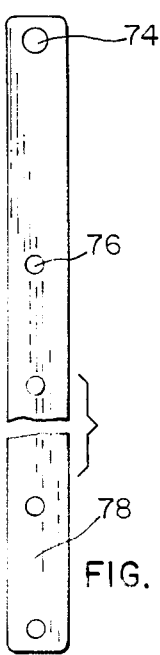
FIG. 4 is a side elevational view of a modified form of hanger bar for the adjustable auxiliary closet rod assembly of FIG. 1.
Figure 5:
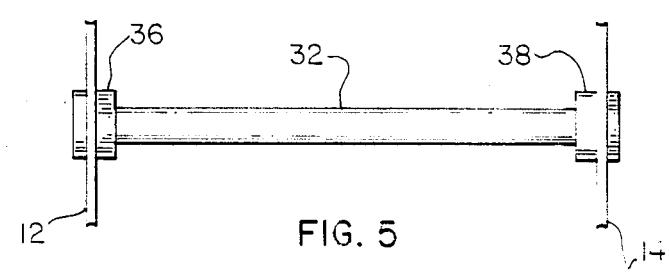
FIG. 5 is a front view of a portion of the adjustable auxiliary closet rod assembly of FIG. 1.

Each of the hanger bar members 12, 14, 16 are made of one elongated piece of rigid material such as plastic or metal having a generally rectangularly cross-sectional configuration. One form of attachment means comprises a hook portion 52 defining a rod receiving groove 54 connected to an upwardly inwardly inclined open ended slot 56, FIG. 2. Hook portion 52 is defined by a vertically extending side wall portion 58, an horizontally extending upper end wall portion 60, and a downwardly extending side wall portion 62, FIG. 3. Groove 54 is defined by a vertically extending straight flat surface 64, a semi-circular curved flat surface 66, and a vertically extending flat surface 68. Slot 56 is defined by an upwardly inwardly inclined flat surface 70 and a rounded end surface 72 on side wall portion 62, FIG. 2. Another form of attachment means comprises a circular rod hole 74, FIG. 4, having a diameter slightly larger than the closet rod diameter so as to slidably receive the closet rod therewithin. Closet rod hole 74 is vertically aligned with auxiliary rod holes 76 along the central longitudinal axis of hanger member 78.

Figure 7:
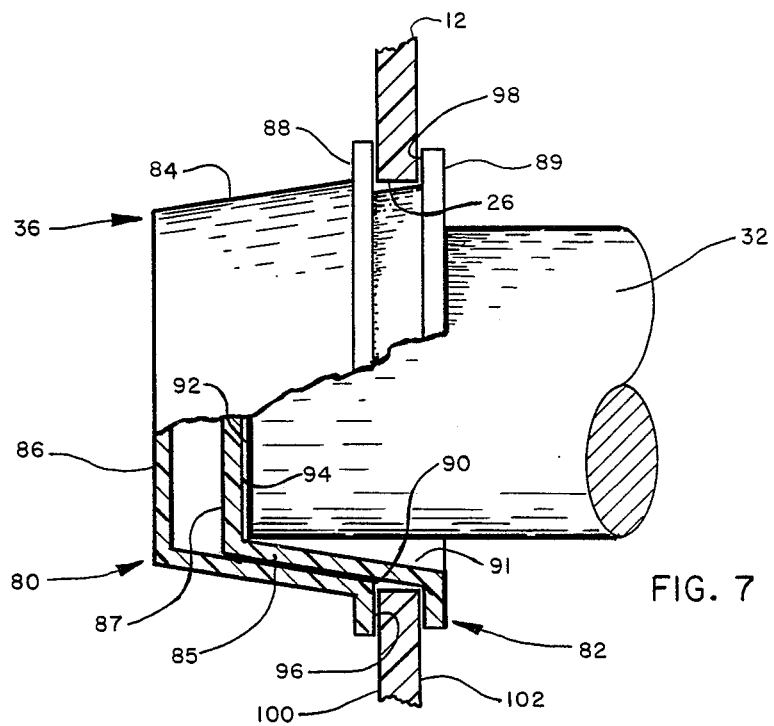
FIG. 7 is an enlarged cross-sectional assembly view of the auxiliary rod mounting system of FIG. 6 with parts broken away.
Figure 6:
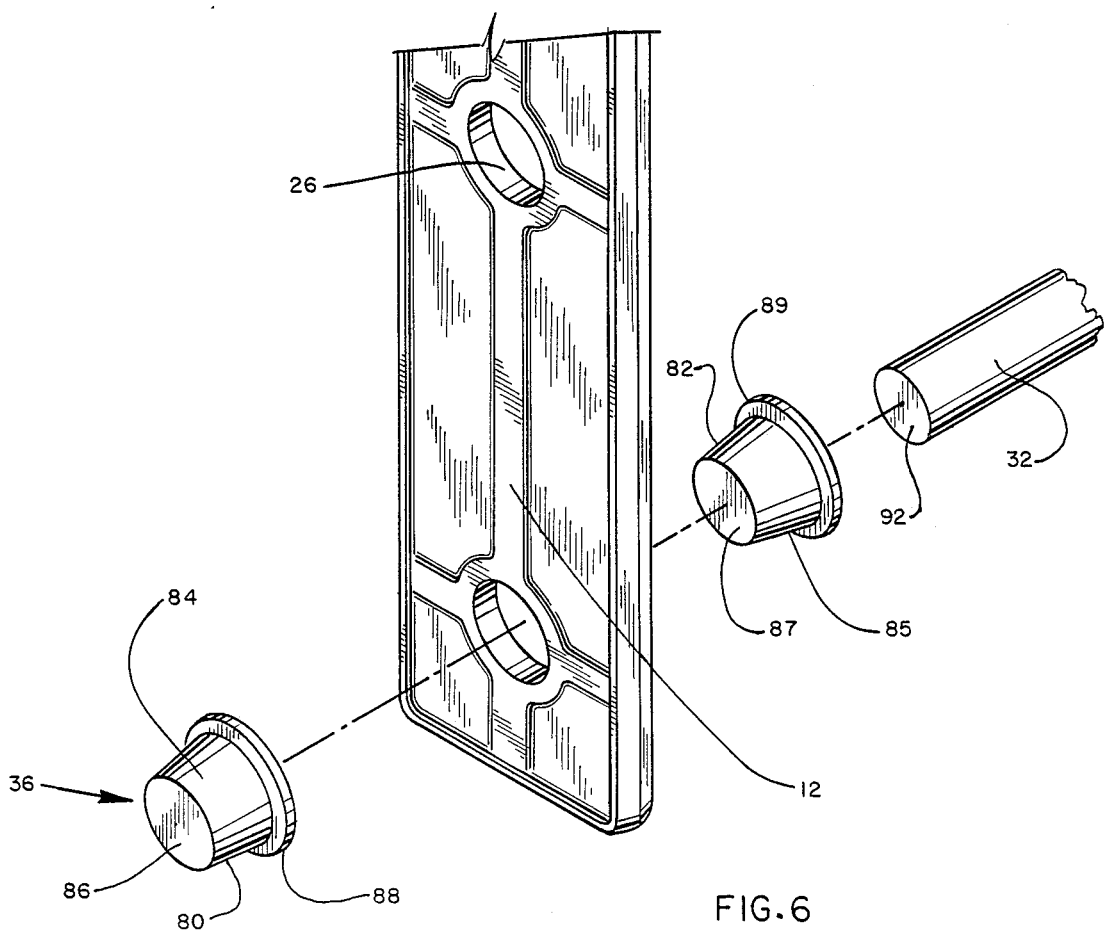
FIG. 6 is an exploded perspective view of an auxiliary rod mounting system.

As shown in FIGS. 6 and 7, auxiliary rod attachment means 36, 38, 40, 42 each comprise a pair of frictionally nestable cup-shape members 80, 82 made of resilient deflectable plastic material. Each cup-shape member comprises a conical side wall portion 84, 85, a circular end wall portion 86, 87 and a circular rim portion 88, 89 surrounding a circular opening 90, 91. The outermost cup member 80 is of slightly larger size and shorter length than the innermost cup member 82 so as to enable the side wall portion 85 of the innermost cup member to be slidably frictionally positioned in nesting telescopic relationship within the side wall portion 84 of the outermost cup member. The outer diameter of the side wall portion 85 of the innermost cup member adjacent rim portion 89 is approximately equal to the diameter of openings 26, 28, 30 so as to be snugly received therewithin. The inner diameter of side wall portion 85 adjacent rim portion 89 is approximately equal to the diameter of rod 32 to enable the end of the rod to be slidably telescopically inserted through opening 91 into member 82 until the rod end surface 92 abuts the inner side surface 94 of member 82 whereby member 82 is frictionally retained on the end portion of rod member 32. The inner diameter of side wall portion 84 of member 80 adjacent rim portion 88 is approximately equal to the outer diameter of a midportion of side wall portion 85 of member 82 so as to be slidably frictionally telescopically mountable on side wall portion 85 as shown in FIG. 7. In the assembled position, side surfaces 96, 98 of rim portions 88, 89 abut the side surfaces 100, 102 of hanger bar 12 circumjacent opening 26. Side walls 84, 85 have a corresponding taper whereby the end portion 92 of rod member 32 is frictionally retained in member 82 which is frictionally retained in opening 26 by member 80.

Figure 8:
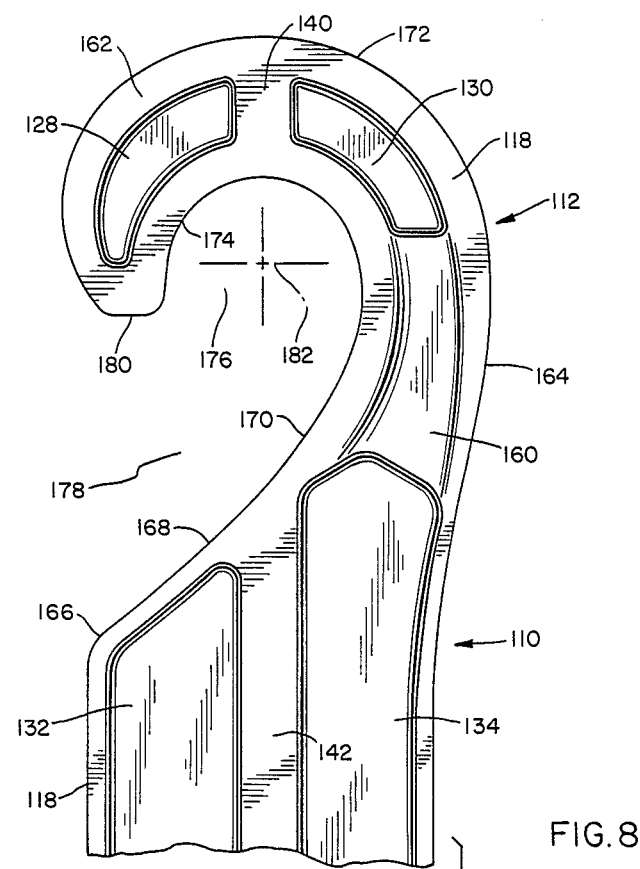
FIG. 8 is a side elevational view of a presently preferred embodiment of the hanger bar with parts removed.
Figure 10:
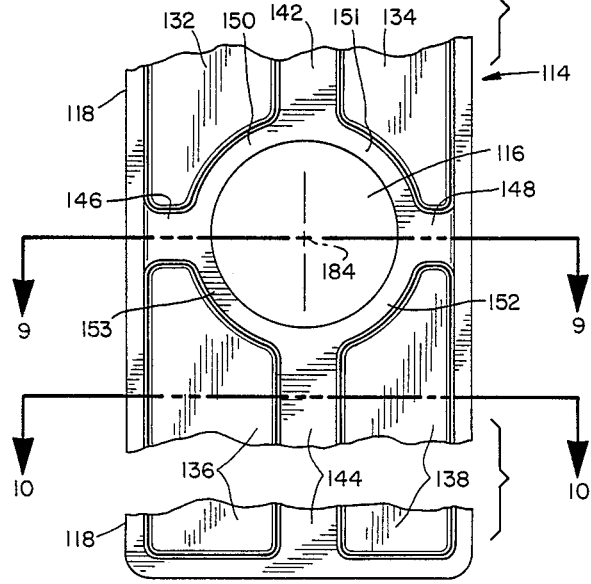
FIG. 10 is a cross-sectional view taken along line 10—10 of FIG. 10.
Figure 10:
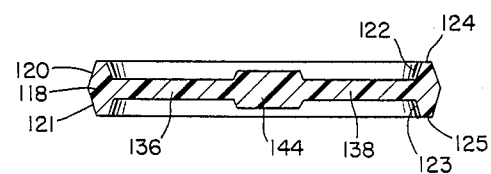
Figure 9:
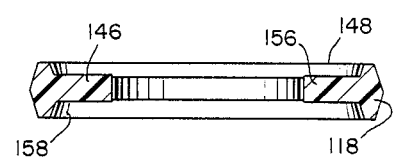
FIG. 9 is a cross-sectional view taken along 9—9 of FIG. 9.

A presently preferred hanger bar member embodiment, shown in FIGS. 8–10, comprises one piece member 110 of molded plastic material having a hook means portion 112 at one end of an elongated body portion 114 with a plurality of spaced circular openings 116. Member 110 comprises an enlarged rim portion 118, defined by inclined side surfaces 120, 121, 122, 123 and opposite end surfaces 124, 125, which surround relatively thin flange portions 128, 130, 132, 134, 136, 138, relatively thick central longitudinally extending reinforcement rib portions 140, 142, 144 and relatively thick laterally extending reinforcement rib portions 146, 148. Rib portions 142, 144, 146, 148 are connected by arcuate segments 150, 151, 152, 153 circumjacent openings 116 which provide flat narrow width surfaces 156, 158 for abutting engagement with rim surfaces 96, 98 of members 80, 82. Hook portion 112 comprises an upwardly outwardly extending neck portion 160 and a reversely curved end portion 162. Neck portion 160 has a straight outer side surface 164 and an inner surface defined by a curved portion 166, a straight upwardly inclined intermediate portion 168, and a curved terminal portion 170. End portion 162 has a variably curved outer surface 172 and a semi-cylindrical inner surface 174, with a diameter approximately equal to the diameter of rod member 32, to define a rod cavity 176 connected to a rod access slot 178 provided between surfaces 168, 170 and lateral surface 180. The central axes 182, 184 of rod cavity 176 and openings 116 are longitudinally aligned with reinforcement rib portions 142, 144.

FIGS. 11 & 12 show an alternative rod retaining means comprising a single cup-shape member 200 made of one piece of resilient flexible plastic material having a tapered cavity 202, tapered inner and outer peripheral walls 203, 204, an end flange portion 206 and an intermediate flange portion 208 defining an annular outer peripheral groove 210. A pair of oppositely spaced rib means 212, 214 extend into slot 210 from end flange portion 206. The perimeter of the holes 26 in the hanger bar members 12 are provided with opposite slots 216, 218 to receive rib means 212, 214 upon insertion of cup member 200 into holes 26 with the side surfaces 220, 222 located between side surfaces 224, 226 of the flange portions 206, 208 as shown in FIG. 12. The construction and arrangement is such as to provide an interference fit between adjoining surfaces of the cup-shape member and the hanger bar member whereby the side wall of the relatively flexible cup-shape member is compressed radially inwardly against the relatively rigid outer peripheral surface of the hanger rod member located in the cavity 202 opposite the rigid peripheral surface of the hole 26. The advantages of the construction and arrangement of the retaining means embodiment of FIGS. 11 & 12 may be obtained by alternative embodiments utilizing rib and slot means providing a resilient frictional interlock between the hanger bar member, the cup-shape member, and the hanger rod member. For example, as shown in FIGS. 13 & 14, a cup-shape member 230 made of one piece of resilient flexible plastic material may include opposite spaced rib portions 232, 234 on the inner peripheral cavity surface 236 so as to be located opposite hole surface portions 234, 240 in the assembled position shown in FIG. 14. Hanger rod member 32 is provided with a pair of opposite holes or slots 242, 244 adapted to receive cup rib portions 232, 234 in the assembled position whereat the rib and slot means provided thereby are located in hole 26 approximately midway between bar side surfaces 220, 222.

The construction and arrangement is such that the hanger members may be made of varying lengths and the lateral distance between adjacent hanger members may be varied as necessary or desirable. The length of the auxiliary rod members may be varied to vary the lateral spacing of each vertically extending area 44, 46 or 48, 50. More than one auxiliary rod member may be used between each adjacent pair of hanger members to provide more than two clothes hanging areas. The construction and arrangement is such as to enable at least 60 pounds of clothing to be hung between adjacent pairs of hanger members. The auxiliary rod members may be variably located to enable children and handicapped persons confined to wheel chairs to reach lowermost rod members. All members are made of relatively inexpensive materials and may be inexpensively constructed. Furthermore, all members are of a size and shape which enables packaging in a relatively small size elongated rectangular bag or box. The members may be manufactured, packaged, and sold without any preassembly operations. Furthermore, the members are assembled for use without any need for the use of any tools such as drills, screwdrivers, hammers or the like. The fastening means securely holds the auxiliary rod members in place between the hanger members without requiring application of any large forces during assembly or disassembly while preventing accidental disassociation of the rod members from the hanger members in use under relatively heavy vertical forces. The construction and arrangement of the hook means is such as to enable easy installation while preventing accidental removal from the main closet rod and enabling a substantial amount of pivotal movement to absorb laterally directed forces.

It is intended that the appended claims be construed to include alternative embodiments except insofar as limited by the prior art.

The invention claimed is:

1. An auxiliary closet rod assembly adapted to be mounted on and supported solely by a main horizontally extending closet rod device fixedly supported by permanently mounted closet structure, comprising:
   at least two rigid elongated hanger bar means, each having spaced opposite side surfaces and a hanger opening at an upper end thereof for pivotal engagement with the main closet rod device and for supporting said hanger bar means in vertically downwardly extending relationship to the main closet rod device and having at least one rod support opening defined by an annular surface in an intermediate portion thereof for receiving and supporting an auxiliary rod means, the hanger opening and the support opening of each hanger bar means being spaced apart equal distances so as to be vertically alignable;
   at least one rigid auxiliary rod means having opposite end portions slidably mountable in and extending through said support openings in adjacent ones of said hanger bar means and extending horizontally therebetween beneath the main closet rod for hanging garments thereon;
   retaining means being mountable on said opposite end portions of said rigid auxiliary rod means and operably associated with said hanger bar means circumjacent said support openings for limiting longitudinal movement of said auxiliary rod means relative to said hanger bar means; said retaining means comprising:
   at least one cup shape member being made of one piece of resilient flexible molded plastic material and having a central opening for slidably frictionally telescopically receiving the end portion of said auxiliary rod member and an outer wall surface for slidably frictionally engaging the surface of said support opening; and
   releasable locking means associated with said cup-shape member for frictionally releasably locking said cup-shape member and the end portion of said auxiliary rod member in said support opening in said hanger bar member.

2. The invention as defined in claim 1 and wherein said cup shape member comprising:
   a conical tapered central side wall portion defining said central opening;
   an end wall portion; and
   a rim portion extending radially outwardly from said central wall portion.

3. The invention as defined in claim 2 and wherein said retaining means further comprises:
   a second cup shape member having a central opening for slidably frictionally telescopically receiving said first cup-shape member and frictionally releasably locking said first cup-shape member and the end portion of said auxiliary rod member in said support opening in said hanger bar member.

4. The invention as defined in claim 3 and wherein:
   the rim portions of the first and second cup-shaped members being adapted to abut opposite side surfaces of the associated one of said hanger bar means.

5. The invention as defined in claims 1, 2 or 4 and wherein:
   said hanger bar means being made of one piece of rigid, high strength molded plastic material.

6. The invention as defined in claim 5 and wherein:
   said auxiliary rod members being made of one piece of wooden material.

7. The invention as defined in claims 1, or 2 and wherein said hanger bar means comprising:
   a hook portion having an upwardly inwardly inclined slot means for slidably receiving the main closet rod; and
   a curved opening at the upper end of said slot means for pivotally engaging said main closet rod.

8. The invention as defined in claim 7 and wherein said hanger bar means further comprising:
   a peripheral rim portion having a relatively large thickness;
   a plurality of reinforcement rib portions extending longitudinally and laterally between said rim portion; and
   a plurality of relatively thin flange portions extending between said rim portion and said reinforcement rib portions.

9. The invention as defined in claim 8 and wherein said hanger bar means further comprising:
   a rim portion surrounding each of said rod openings and located between said reinforcement rib portions and forming an integral extension thereof.

10. The invention as defined in claim 2 and wherein said releasable locking means comprising:
    at least one of said hanger bar means and said auxiliary rod means having at least one radially extending slot means provided therein which is located axially between said spaced opposite side surfaces of said hanger bar means and radially opposite the portion of the auxiliary rod means extending through said rod support opening in the assembled position;
    a rib means on said central side wall portion of said cup shaped member and projecting radially therefrom for frictional retaining with said slot means between said opposite side surfaces of said hanger bar means in the assembled position whereby radially directed forces are applied to the side wall portion of said cup shaped member and to said rib means to effect locking engagement therebetween; and
    one of said hanger bar means and said hanger rod means having slot means formed therein for receiving said rib means in the assembled position;
    the construction and arrangement of said hanger bar means and said cup shaped member and said rod means being such that in the assembled position said rib means is forcibly received in said slot means by radial deflection of said central side wall portion toward said slot means to effect frictional retaining engagement of said rib means with said slot means.

11. The invention as defined in claim 10 and wherein: said slot means is located on said auxiliary rod means.

12. The invention as defined in claim 10 and wherein: said slot means is located on said hanger bar means.

13. The invention as defined in either claim 11 or 12 and wherein:
there are at least two of said slot means and said rib means are located 180° apart.

* * * * *